(12) United States Patent (10) Patent No.: US 12,565,154 B2
Dai (45) Date of Patent: Mar. 3, 2026

(54) FOLDABLE STORAGE BASKET FOR LOW-SPEED ELECTRIC VEHICLE

(71) Applicant: Xiamen Dalle New Energy Automobile Co., Ltd, Xiamen (CN)

(72) Inventor: Side Dai, Xiamen (CN)

(73) Assignee: Xiamen Dalle New Energy Automobile Co., Ltd, Xiamen City (CN)

( * ) Notice: Subject to any disclaimer, the term of this patent is extended or adjusted under 35 U.S.C. 154(b) by 51 days.

(21) Appl. No.: 18/659,435

(22) Filed: May 9, 2024

(65) Prior Publication Data

US 2025/0303975 A1     Oct. 2, 2025

(30) Foreign Application Priority Data

Mar. 29, 2024     (CN) ......................... 202420637928.X

(51) Int. Cl.
*B60R 9/06* (2006.01)
*B60R 9/00* (2006.01)
*B60R 11/00* (2006.01)

(52) U.S. Cl.
CPC ................. *B60R 9/06* (2013.01); *B60R 9/00* (2013.01); *B60R 2011/0082* (2013.01)

(58) Field of Classification Search
CPC ......................... B60R 9/06; B60R 2011/0082
USPC ............................................. 224/497, 549
See application file for complete search history.

(56) References Cited

U.S. PATENT DOCUMENTS

| | | | | |
|---|---|---|---|---|
| 1,179,445 A * | 4/1916 | Manning | ................. | B60R 7/043 224/275 |
| 1,941,860 A * | 1/1934 | Hanson | .................... | B60R 5/041 224/500 |
| 6,478,203 B2 * | 11/2002 | Burns | ..................... | B60R 9/065 280/DIG. 6 |
| 6,712,248 B2 * | 3/2004 | Mitchell | .................. | B60R 9/06 224/498 |
| 6,848,732 B2 * | 2/2005 | Green | ....................... | B60P 3/03 296/24.33 |
| 7,316,339 B2 * | 1/2008 | Zhang | ....................... | B60R 9/06 224/524 |
| 7,350,681 B2 * | 4/2008 | Polburn | ................. | B60R 7/005 296/37.16 |
| 8,061,571 B2 * | 11/2011 | Aghajanian | ............... | B60R 9/06 224/527 |
| 10,384,617 B1 * | 8/2019 | Keyser | ..................... | B60R 9/06 |
| 10,899,284 B2 * | 1/2021 | Descoteaux | ........... | B60R 11/06 |
| 11,560,099 B2 * | 1/2023 | Pinkston | .................. | B60R 9/06 |
| 11,858,466 B2 * | 1/2024 | Gandolfo | ................ | B60R 7/043 |
| 2003/0173387 A1 * | 9/2003 | Mitchell | ................... | B60R 9/06 224/499 |

(Continued)

*Primary Examiner* — Justin M Larson

(57) ABSTRACT

A foldable storage basket for a low-speed electric vehicle, including a fixing frame, a basket body, and an opening-closing device. The basket body is rotatably connected to the fixing frame, and the basket body is capable of being folded on the fixing frame and being unfolded relative to the fixing frame through the opening-closing device. The fixing frame is fixed to the low-speed electric vehicle. The basket body includes a basket plate, a fence rotatably connected to the basket plate, and a guardrail rotatably connected to the fence. In condition of the basket body being unfolded relative to fixing frame, the basket body and the fixing frame enclose to form a frame structure with an open upper end.

7 Claims, 7 Drawing Sheets

(56)                    References Cited

U.S. PATENT DOCUMENTS

2005/0242141 A1 * 11/2005 Zhang ....................... B60R 9/06
                                                       224/499
2009/0020576 A1 *  1/2009 Gale ........................ B60R 9/06
                                                       224/498
2025/0249324 A1 *  8/2025 Dai ........................ A63B 55/61

* cited by examiner

FOLDABLE STORAGE BASKET FOR LOW-SPEED ELECTRIC VEHICLE

CROSS REFERENCE

The present disclosure claims priority of Chinese Patent Application No. 202420637928.X, filed on Mar. 29, 2024, the entire contents of which are hereby incorporated by reference in their entirety.

TECHNICAL FIELD

The present disclosure relates to the technical field of electric vehicles, and more specifically to a foldable storage basket for a low-speed electric vehicle.

BACKGROUND

Low-speed electric vehicles have various types, and correspondingly have various functions. In the process of driving, it is often required to place tools and items. For example, golf carts are under the needs of placing golf balls. Since the space inside the vehicles are limited, roof racks or rear storage baskets and other devices are widely used. However, in practice, the roof racks are more inconvenient to use due to the height of the racks, and further cause the vehicle's center of gravity to be unstable. In addition, in order to place more items, the current rear storage basket is usually larger in size, and thus it is extremely inconvenient to disassemble and organize.

SUMMARY OF THE DISCLOSURE

The main purpose of the present disclosure is to provide a foldable storage basket for a low-speed electric vehicle in order to solve the above problems raised in the related art.

Compared to the related art, the beneficial effect of the present disclosure is that: a foldable storage basket for a low-speed electric vehicle, including: a fixing frame, a basket body, and an opening-closing device; wherein the basket body is rotatably connected to the fixing frame, and the basket body is capable of being folded on the fixing frame and being unfolded relative to the fixing frame through the opening-closing device; the fixing frame is fixed to the low-speed electric vehicle; the basket body includes a basket plate, a fence rotatably connected to the basket plate, and a guardrail rotatably connected to the fence; in condition of the basket body being unfolded relative to fixing frame, the basket body and the fixing frame enclose to form a frame structure with an open upper end.

In some embodiments, the guardrail includes two guardrails, and the two guardrails are symmetrically disposed at both ends of the fence; the fence is arranged opposite to fixing frame, and the guardrail is connected between the fence and the fixing frame in condition of the basket body being unfolded relative to fixing frame.

In some embodiments, the opening-closing device includes a pin, a wrench, a connecting rod for connecting the pin and the wrench, and a slot defined on the fixing frame to be snapped with the pin; the connecting rod is hingedly connected to the fixing frame, the wrench is fixedly connected to a middle portion of the connecting rod, and the pin is fixedly arranged at each of two ends of the connecting rod; in condition of the wrench being rotated, the pin is snapped within the slot or separated from the slot.

In some embodiments, the slot is a U-shaped slot with an opening toward the pin.

In some embodiments, an end of the U-shaped slot is a curved structure with a curved surface upwardly, coinciding with a trajectory of a movement of the pin being snapped with the slot or separated from the slot.

In some embodiments, the guardrail is capable of being snapped with the fixing frame and being separated from the fixing frame through a snap-fit device.

In some embodiments, the snap-fit device includes a clamping block arranged on the fixing frame and a clamping slot defined on the guardrail adapted to the clamping block.

In some embodiments, a rotational limiting device is arranged between fixing frame and basket plate.

In some embodiments, the rotational limiting device includes a pulling rope; an end of the pulling rope is fixed to the fixing frame, and at the other end of the pulling rope is fixed to the basket plate; in condition of the basket body being unfolded relative to the fixing frame, a triangular structure is formed between the fixing frame, the basket plate, and the pulling rope.

Compared with the related art, the beneficial effect of the present disclosure is that: in the present disclosure, the basket body of the storage basket is rotatably connected to the fixing frame, and is folded on the fixing frame or unfolded relative to the fixing frame through an opening-closing device; when the basket body is unfolded relative to the fixing frame, the basket body and the fixing frame enclose to form a frame structure with an open upper end, such that more items can be placed into. In addition, more space can be saved when it is folded.

Figure 1:
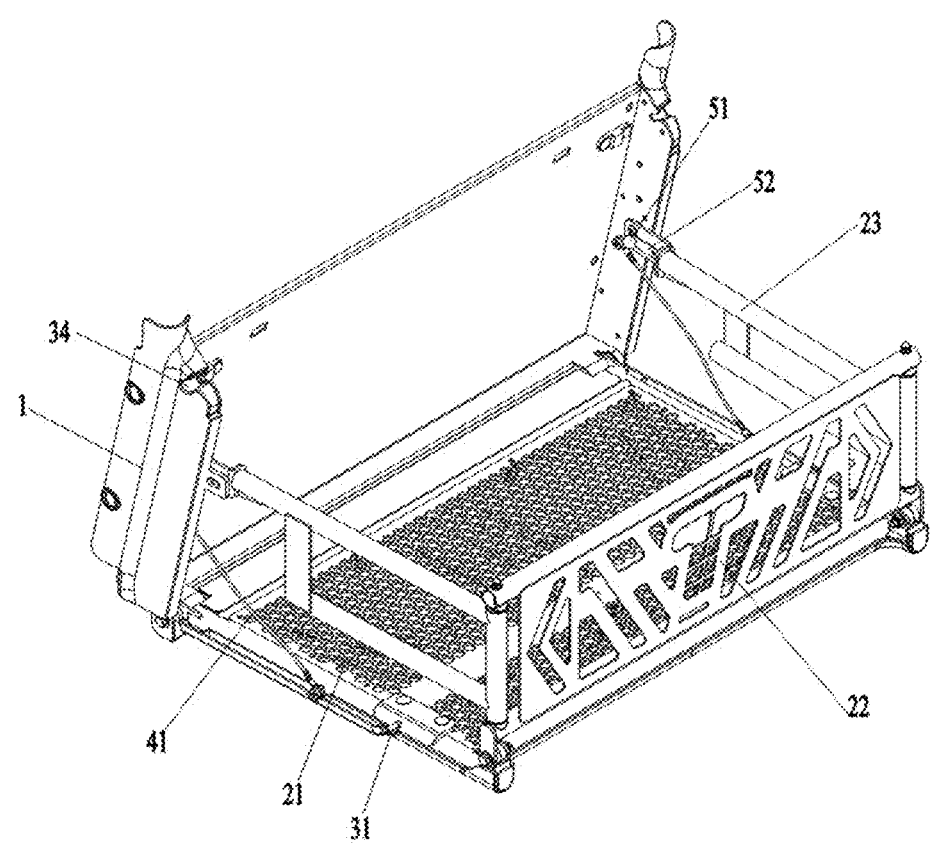
FIG. 1 is a structural schematic view of a foldable storage basket for a low-speed electric vehicle according to some embodiments of the present disclosure.
Figure 2:
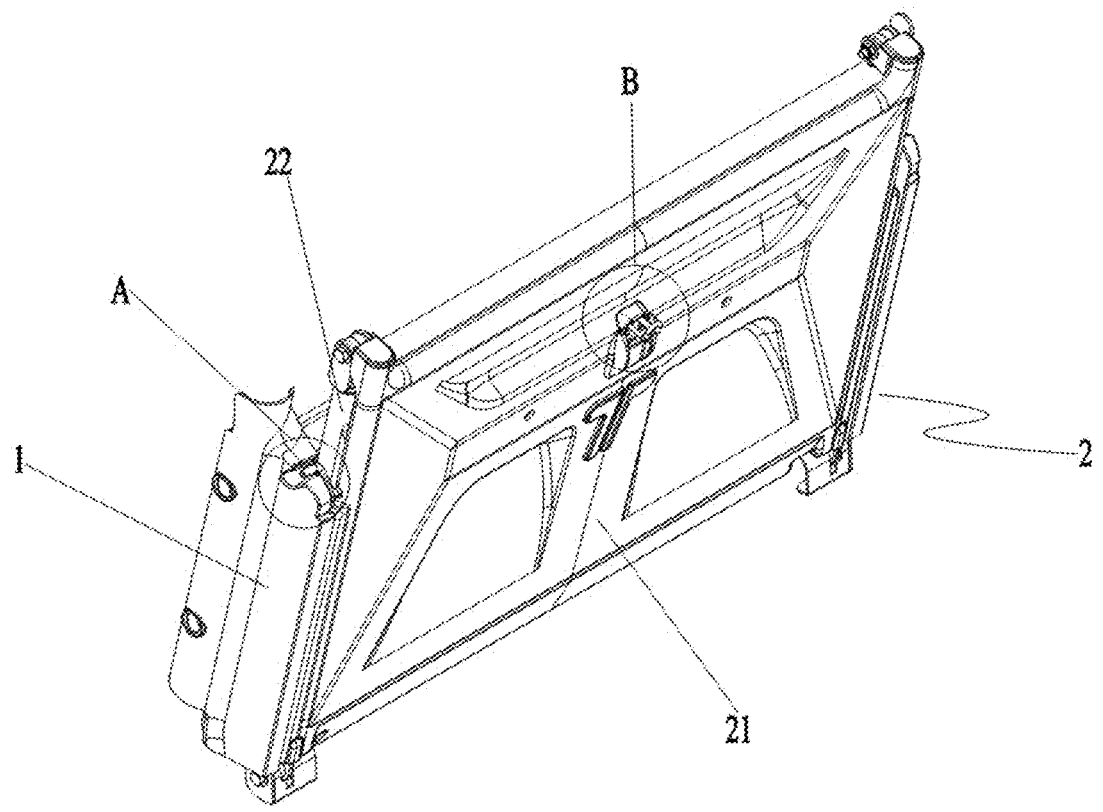
FIG. 2 is a structural schematic view of a foldable storage basket for a low-speed electric vehicle during a folding process according to some embodiments of the present disclosure.
Figure 3:
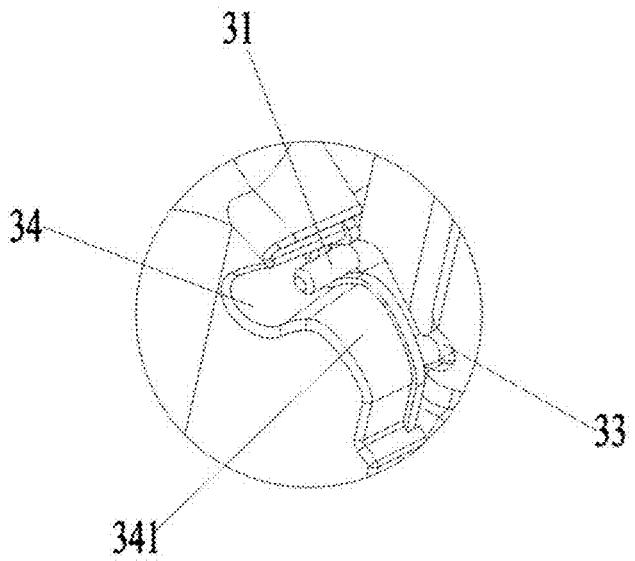
FIG. 3 is a partially enlarged view of area A in FIG. 2.
Figure 4:
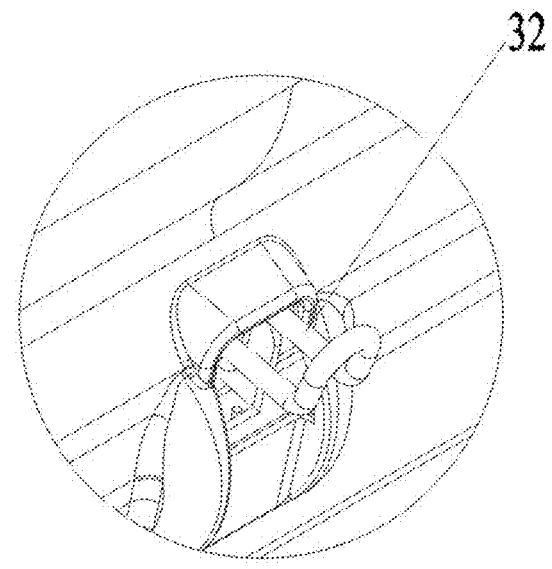
FIG. 4 is a partially enlarged view of area B in FIG. 2.
Figure 5:
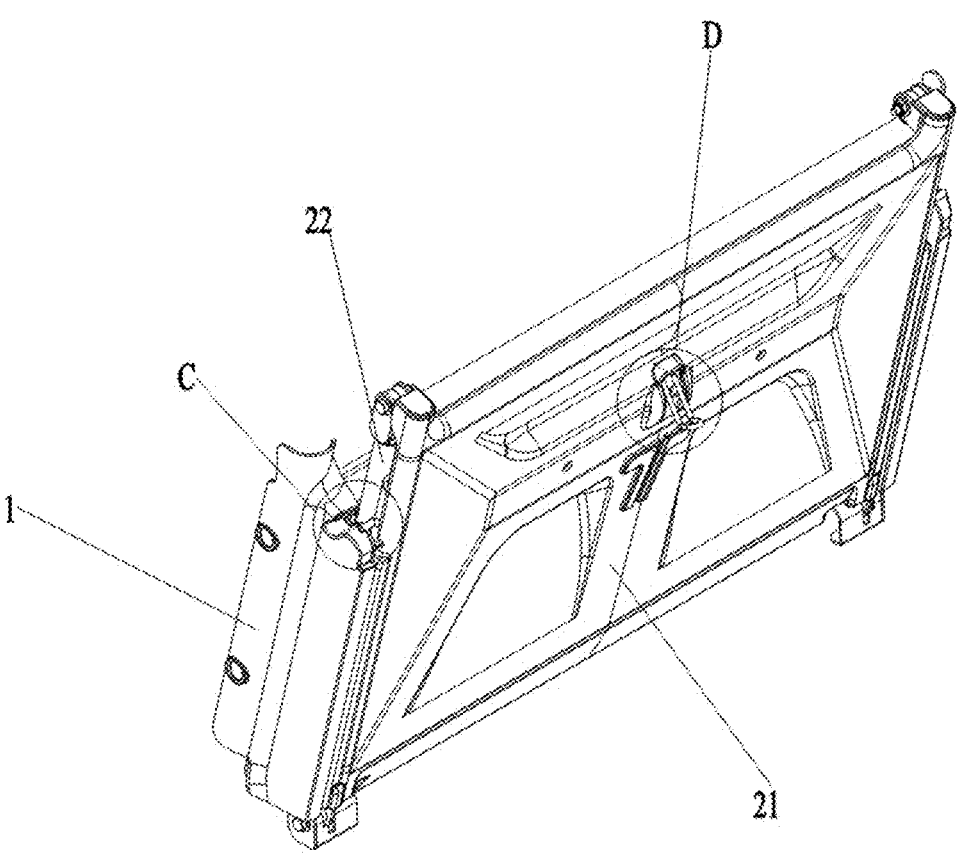
FIG. 5 is a structural schematic view of a foldable storage basket for a low-speed electric vehicle in a folded state according to some embodiments of the present disclosure.
Figure 6:
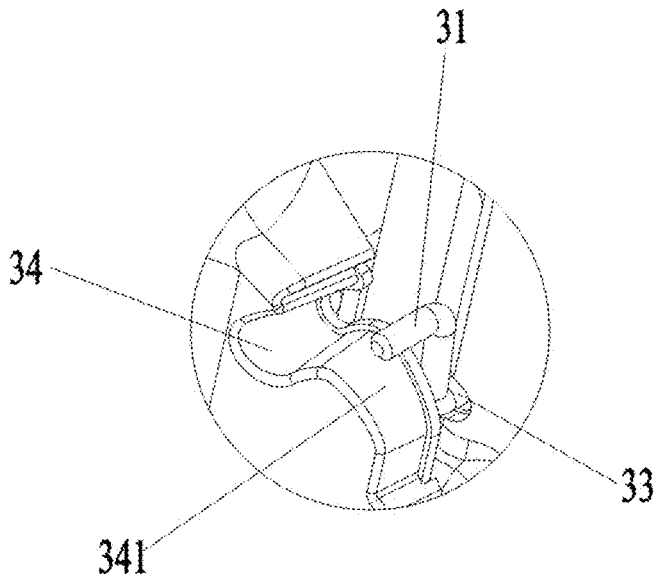
FIG. 6 is a partially enlarged view of area C in FIG. 5.
Figure 7:
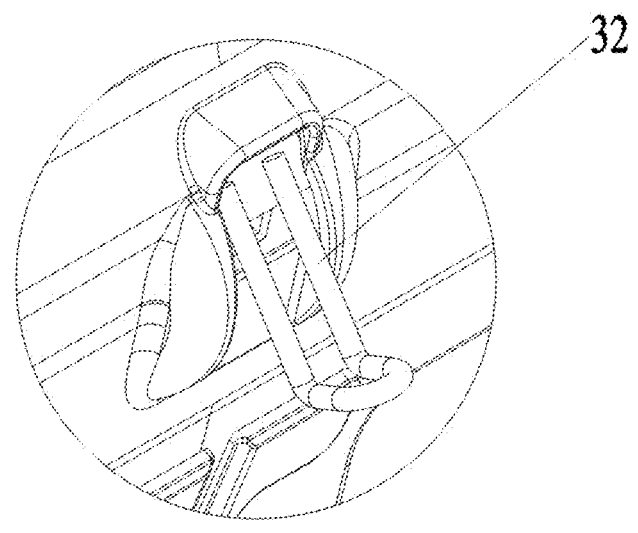
FIG. 7 is a partially enlarged view of area D in FIG. 5.

In the drawings: 100—foldable storage basket, 1—fixing frame, 2—basket body, 21—basket plate, 22—fence, 23—guardrail, 31—pin, 32—wrench, 33—connecting rod, 34—slot, 341—curved structure, 41—pulling rope, 51—clamping block, 52—clamping slot.

DETAILED DESCRIPTION

The technical solutions in the embodiments of the present disclosure will be described clearly and completely in the following in conjunction with the accompanying drawings in the embodiments of the present disclosure, and it is obvious that the described embodiments are only a part of the embodiments of the present disclosure and not all of the embodiments. Based on the embodiments in the present disclosure, all other embodiments obtained by those skilled in the art without making creative labor fall within the scope of the present disclosure.

As shown in FIGS. 1 to 7, the present embodiments provide a foldable storage basket 100 for a low-speed electric vehicle, including a fixing frame 1, a basket body 2, and an opening-closing device; the basket body 2 is rotatably connected to the fixing frame 1, and is folded on the fixing frame 1 or unfolded relative to the fixing frame 1 through the opening-closing device; the fixing frame 1 is fixed to the electric vehicle. In the embodiments, the basket body 2 includes a basket plate 21, a fence 22 rotatably connected to the basket plate 21, and a guardrail 23 rotatably connected to the fence 22; where the fence 22 is arranged opposite to fixing frame 1, and the basket plate 21 is rotatably connected to fixing frame 1; a rotational limiting device is arranged between fixing frame 1 and basket plate 21; the guardrail 23 includes two guardrails 23, where the two guardrails 23 are symmetrically disposed at both ends of the fence 22, and each guardrail 23 is snapped with or separated from the fixing frame 1 through a snap-fit device. The above rotatable connection can be realized through a rotation shaft, which is prior art and will not be repeated herein. When the basket body 2 is unfolded relative to fixing frame 1, the basket plate 21 is unfolded relative to fixing frame 1, the fence 22 is unfolded relative to the basket plate 21, the guardrail 23 is unfolded relative to the fence 22, and the guardrail 23 is connected between the fence 22 and the fixing frame 1, such that the basket body 2 and the fixing frame 1 enclose to form a frame structure with an open upper end, which is convenient for placing objects. When the basket body 2 is folded relative to the fixing frame 1, the guardrail 23 is folded relative to the fence 22, the fence 22 is folded relative to the basket plate 21, and the basket plate 21 is folded relative to the fixing frame 1, such that the basket body 2 is folded relative to the fixing frame 1 and stored on the fixing frame 1, which is convenient for storage and saves occupied space.

The opening-closing device includes a pin 31, a wrench 32, a connecting rod 33 for connecting the pin 31 and the wrench 32, and a slot 34 defined on the fixing frame 1 to be snapped with the pin; the connecting rod 33 is hingedly connected to the fixing frame 1, the wrench 32 is fixedly connected to a middle portion of the connecting rod 33, and the pin 31 is fixedly arranged at each of two ends of the connecting rod 33. When the wrench 32 is rotated, the pin 31 is snapped within the slot 34 or separated from the slot 34. The slot 34 is a U-shaped slot with an opening toward the pin 31, where an end of the U-shaped slot is a curved structure 341 with a curved surface upwardly, coinciding with a trajectory of a movement of the pin 31 being snapped with the slot 34 or separated from the slot 34.

The snap-fit device includes a clamping block 51 arranged on the fixing frame 1 and a clamping slot 52 defined on the guardrail 23 adapted to the clamping block 51; when the clamping block 51 snapped within the clamping slot 52, the guardrail 23 is snapped with the fixing frame 1; when the clamping block 51 is separated from the clamping slot 52, the guardrail 23 is relatively separated from the fixing frame 1, and the guardrail 23 is in a movable state and foldable relative to the fence 22.

The rotational limiting device includes a pulling rope 41; an end of the pulling rope 41 is fixed to the fixing frame 1, and at the other end of the pulling rope 41 is fixed to the basket plate 21; when the basket body 2 is unfolded relative to the fixing frame 1, a triangular structure is formed between the fixing frame 1, the basket plate 21, and the pulling rope 41, which makes the unfolded shelving basket structure more stable. The pulling rope 41 may be made of plastic, fiber, metal, etc.

Figure 8:
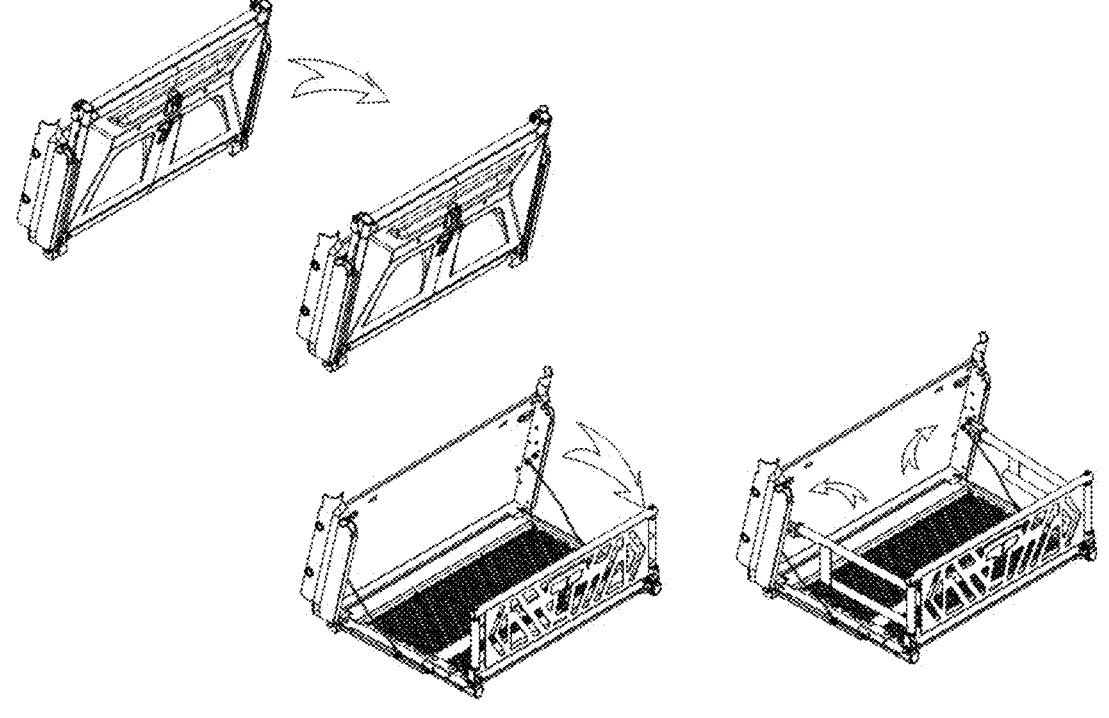
FIG. 8 is a schematic view of an unfolding process of a foldable storage basket for a low-speed electric vehicle according to some embodiments of the present disclosure.

As shown in FIG. 8, in an initial state, the basket is in a folded state. In use, the wrench 32 is rotated downward, such that the connecting rod 33 is rotated, which in turn drives the pin 31 to rotate, causing the pin 31 to detach from the slot 34 along the curved surface of the slot 34; the basket plate 21 is rotated downward, such that the basket plate 21 is rotated and unfolded relative to the fixing frame 1, and the pulling rope 41 is gradually pulled apart, forming a triangular structure among the fixing frame 1, the basket plate 21, and the pulling rope 41; the fence 22 is rotated, such that the fence 22 is rotated relative to the basket plate 21; the guardrails 23 on both sides of the fence 22 are rotated, such that the guardrails 23 are rotated relative to the fence 22; the clamping block 51 is inserted into the clamping slot 52, such that the guardrail 23 is snapped with the fixing frame 1. In this way, the basket body 2 and the fixing frame 1 enclose to form a frame structure with an open top end to place items. When it is necessary to store the storage basket, the clamping block 51 is disengaged from the clamping slot 52, such that the guardrail 23 is separated from the fixing frame 1; the guardrails 23 are reversely rotated, such that the guardrail 23 is folded relative to the fence 22; the fence 22 is reversely rotated, such that the fence 22 is folded relative to the basket plate 21; the basket plate 21 is upwardly rotated, such that the basket plate 2 is folded relative to the fixing frame 1; at the same time, the wrench 32 is upwardly rotated, such that the connecting rod 33 is rotated therewith, which in turn drives the pin 31 to rotate, causing the pin 31 to snap into the slot 34 along the curved surface of the slot 34 to be snapped with the slot 34. In this way, the basket body 2 is folded relative to the fixing frame 1 for convenient storage.

Figure 9:
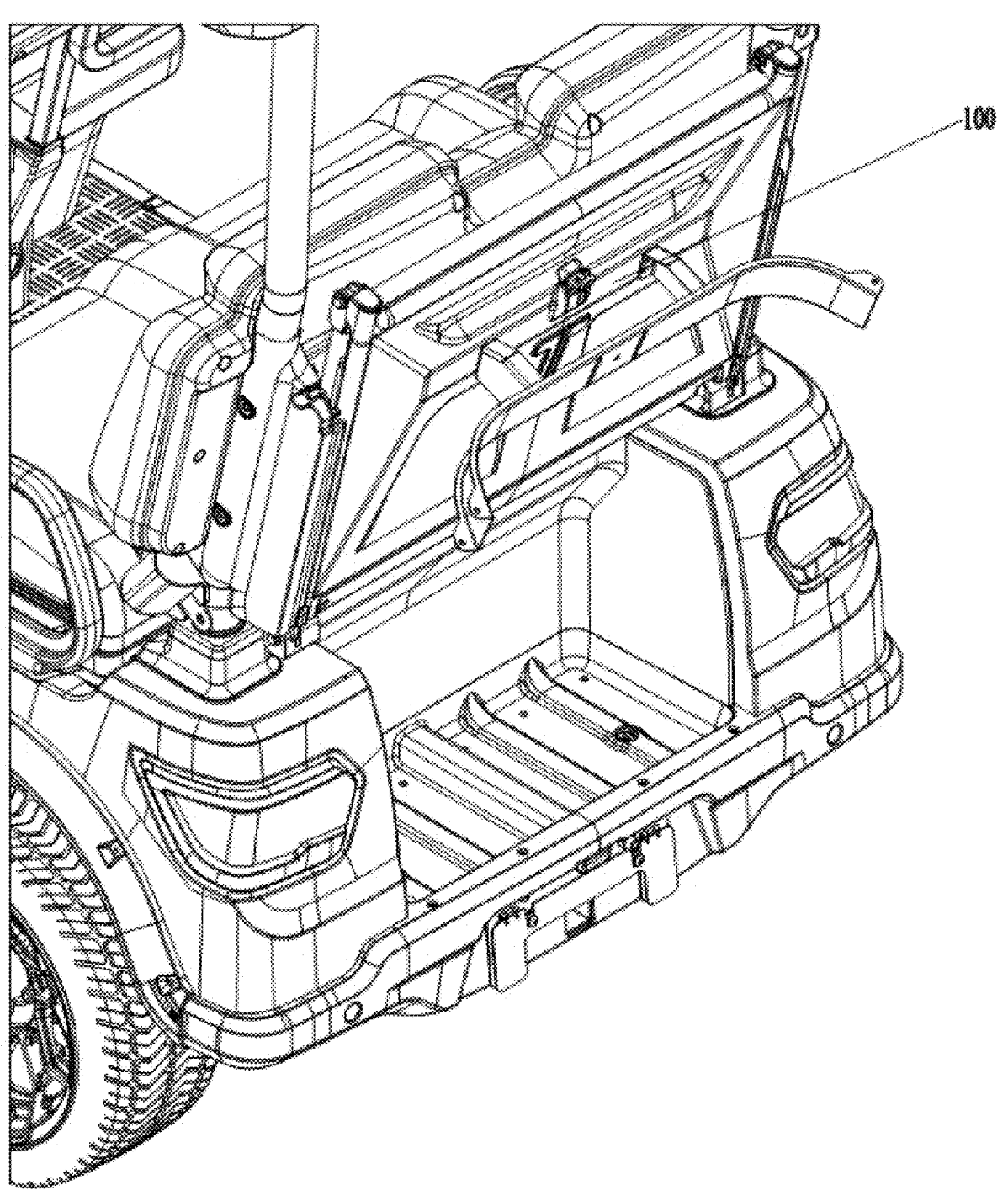
FIG. 9 is a structural schematic view of a foldable storage basket, in a low-speed electric vehicle, in a folded state according to some embodiments of the present disclosure.
Figure 10:
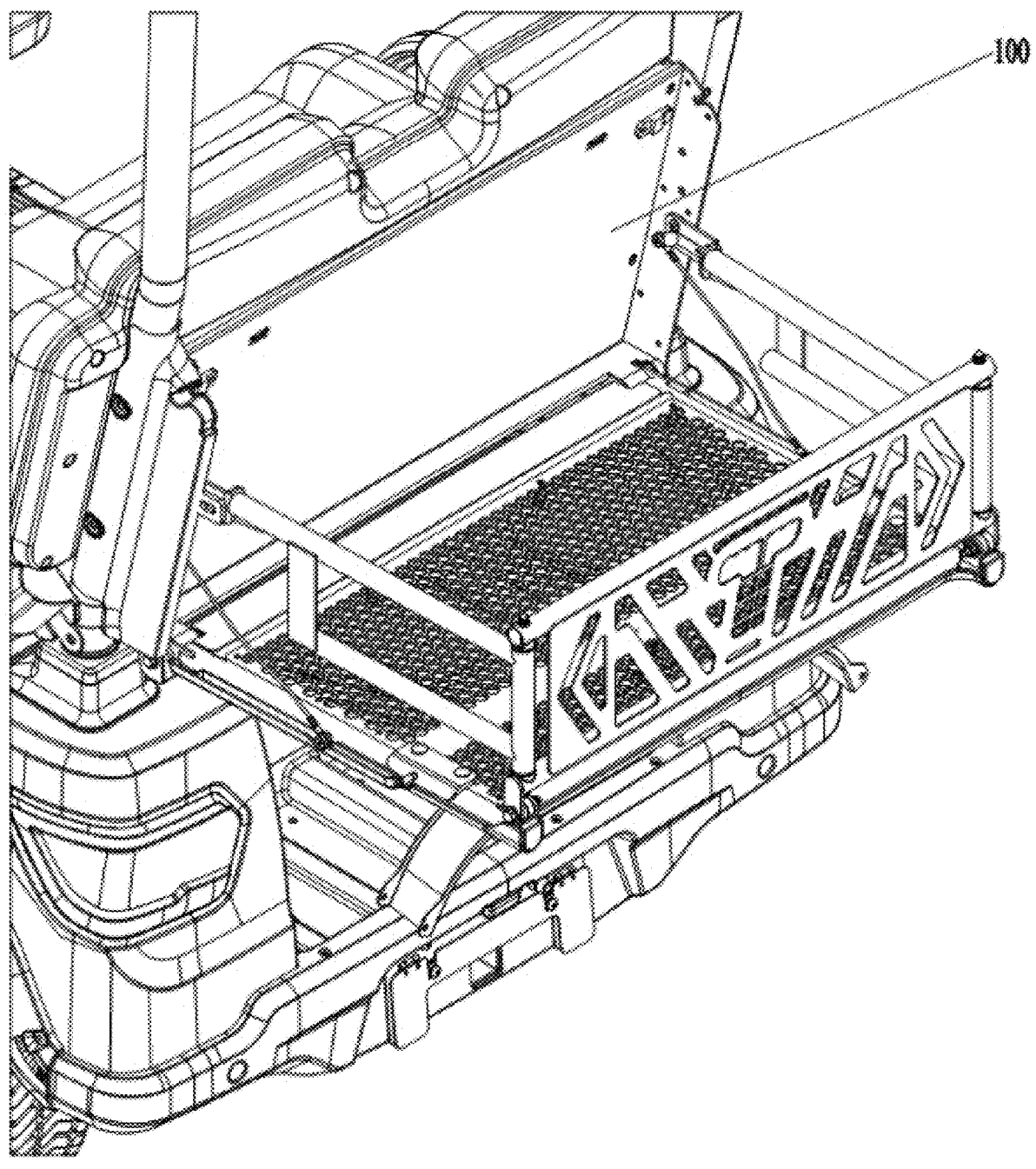
FIG. 10 is a structural schematic view of a foldable storage basket, in a low-speed electric vehicle, in an unfolded state according to some embodiments of the present disclosure.

As shown in FIGS. 9 to 10, the present embodiments further provide a low-speed electric vehicle including the above-described foldable storage basket 100; the foldable storage basket is arranged on a rear portion of the vehicle, and the low-speed electric vehicle includes one or more of a sightseeing car, a golf cart, a fire truck, and a patrol car.

In the present disclosure, the basket body of the storage basket is rotatably connected to the fixing frame, and is folded on the fixing frame or unfolded relative to the fixing frame through an opening-closing device; when the basket body is unfolded relative to the fixing frame, the basket body and the fixing frame enclose to form a frame structure with an open upper end, such that more items can be placed into. In addition, more space can be saved when it is folded.

Although the present disclosure has been described in detail with reference to the foregoing embodiments, for those skilled in the art, it is still possible to make modifications to the technical solutions recorded in the foregoing embodiments, or make equivalent replacements for some of the technical features therein. Any modifications, equivalent replacements, improvements, etc. made within the spirit and principles of the present disclosure shall be included in the scope of the present disclosure.

5

6

What is claimed is:

1. A foldable storage basket for a low-speed electric vehicle, comprising:

a fixing frame, a basket body, and an opening-closing device;

wherein the basket body is rotatably connected to the fixing frame, and the basket body is capable of being folded on the fixing frame and being unfolded relative to the fixing frame through the opening-closing device; the fixing frame is fixed to the low-speed electric vehicle; the basket body comprises a basket plate, a fence rotatably connected to the basket plate, and a guardrail rotatably connected to the fence; in condition of the basket body being unfolded relative to fixing frame, the basket body and the fixing frame enclose to form a frame structure with an open upper end;

wherein the opening-closing device comprises a pin, a wrench, a connecting rod for connecting the pin and the wrench, and a slot defined on the fixing frame to be snapped with the pin; the connecting rod is hingedly connected to the fixing frame, the wrench is fixedly connected to a middle portion of the connecting rod, and the pin is fixedly arranged at each of two ends of the connecting rod; in condition of the wrench being rotated, the pin is snapped within the slot or separated from the slot.

2. The foldable storage basket according to claim 1, wherein the guardrail comprises two guardrails, and the two guardrails are symmetrically disposed at both ends of the fence; the fence is arranged opposite to the fixing frame, and the guardrail is connected between the fence and the fixing frame in condition of the basket body being unfolded relative to the fixing frame.

3. The foldable storage basket according to claim 1, wherein the guardrail is capable of being snapped with the fixing frame and being separated from the fixing frame through a snap-fit device.

4. The foldable storage basket according to claim 1, wherein the slot is a U-shaped slot with an opening toward the pin.

5. The foldable storage basket according to claim 4, wherein an end of the U-shaped slot is a curved structure with a curved surface upwardly, coinciding with a trajectory of a movement of the pin being snapped with the slot or separated from the slot.

6. The foldable storage basket according to claim 1, wherein a rotational limiting device is arranged between the fixing frame and the basket plate.

7. The foldable storage basket according to claim 6, wherein the rotational limiting device comprises a pulling rope; an end of the pulling rope is fixed to the fixing frame, and at an other end of the pulling rope is fixed to the basket plate; in condition of the basket body being unfolded relative to the fixing frame, a triangular structure is formed between the fixing frame, the basket plate, and the pulling rope.

* * * * *